United States Patent
Kadobayashi (10) Patent No.: US 9,635,203 B2
(45) Date of Patent: Apr. 25, 2017

(54) IMAGE READING APPARATUS AND IMAGE FORMING APPARATUS THAT ACHIEVE APPROPRIATE CONTINUOUS READING AND RECORDING MEDIUM

(71) Applicant: KYOCERA Document Solutions Inc., Osaka (JP)

(72) Inventor: Mizue Kadobayashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/957,091

(22) Filed: Dec. 2, 2015

(65) Prior Publication Data
US 2016/0182754 A1    Jun. 23, 2016

(30) Foreign Application Priority Data
Dec. 19, 2014    (JP) .................................. 2014-256946

(51) Int. Cl.
| | | |
|---|---|---|
| *G06K 15/00* | (2006.01) | |
| *H04N 1/00* | (2006.01) | |
| *H04N 1/10* | (2006.01) | |

(52) U.S. Cl.
CPC ....... *H04N 1/00782* (2013.01); *H04N 1/0083* (2013.01); *H04N 1/00551* (2013.01);
(Continued)

(58) Field of Classification Search
USPC ....................................................... 358/1.15
See application file for complete search history.

(56) References Cited

U.S. PATENT DOCUMENTS

| | | | | |
|---|---|---|---|---|
| 4,708,461 A | * | 11/1987 | Okuda ............... | G03G 15/5012 399/87 |
| 4,763,160 A | * | 8/1988 | Honjo ...................... | B65H 7/14 271/227 |

(Continued)

FOREIGN PATENT DOCUMENTS

| | | | | |
|---|---|---|---|---|
| JP | 53-44019 | 4/1978 | | |
| JP | 362294264 | * 12/1987 | ............. | G03G 15/00 |

(Continued)

OTHER PUBLICATIONS

Japanese Office Action dated Sep. 28, 2016, issued by the Japanese Patent Office in corresponding application JP 2014-256946.

*Primary Examiner* — Jerome Grant, II
(74) *Attorney, Agent, or Firm* — Stein IP, LLC (57) ABSTRACT

An image reading apparatus includes an image reading circuit, an instruction accepting circuit, a timer circuit, a standby time determining circuit, and a reading start timing control circuit. The instruction accepting circuit accepts an image reading instruction. The timer circuit sets a preliminary specified reference event as an origin. The timer circuit measures an elapsed time from the origin until the instruction accepting circuit accepts the image reading instruction. The standby time determining circuit determines a standby time based on the elapsed time measured by the timer circuit. The reading start timing control circuit causes the image reading circuit to start image reading of the document at an elapse of the standby time determined by the standby time determining circuit from the reference event when the reference event occurs after the standby time determining circuit determines the standby time.

12 Claims, 5 Drawing Sheets

(52) U.S. Cl.
CPC ..... *H04N 1/00708* (2013.01); *H04N 1/00801* (2013.01); *H04N 1/1061* (2013.01); *H04N 2201/0094* (2013.01)

(56) References Cited

U.S. PATENT DOCUMENTS

| | | | | |
|---|---|---|---|---|
| 5,181,073 | A * | 1/1993 | Araki | G03G 15/607 |
| | | | | 399/16 |
| 5,734,958 | A * | 3/1998 | Kazama | G03G 15/607 |
| | | | | 271/3.15 |
| 2006/0227375 | A1* | 10/2006 | Kamimura | H04N 1/32486 |
| | | | | 358/1.16 |
| 2009/0244659 | A1* | 10/2009 | Ito | H04N 1/00525 |
| | | | | 358/498 |
| 2010/0007077 | A1* | 1/2010 | Satake | B65H 1/04 |
| | | | | 271/111 |
| 2015/0329304 | A1* | 11/2015 | Mochizuki | B65H 3/0669 |
| | | | | 271/9.05 |

FOREIGN PATENT DOCUMENTS

| | | |
|---|---|---|
| JP | 2003-167494 A | 6/2003 |
| JP | 2012-160896 A | 8/2012 |

\* cited by examiner

IMAGE READING APPARATUS AND IMAGE FORMING APPARATUS THAT ACHIEVE APPROPRIATE CONTINUOUS READING AND RECORDING MEDIUM

INCORPORATION BY REFERENCE

This application is based upon, and claims the benefit of priority from, corresponding Japanese Patent Application No. 2014-256946 filed in the Japan Patent Office on Dec. 19, 2014, the entire contents of which are incorporated herein by reference.

BACKGROUND

Unless otherwise indicated herein, the description in this section is not prior art to the claims in this application and is not admitted to be prior art by inclusion in this section.

There has been known an image reading apparatus, for a copier, a facsimile, a scanner, or a multi-functional peripheral, that has a configuration including a movable carriage under a platen (a platen glass). With this image reading apparatus, a document is placed on the platen with a read-target face facing the platen. The image on the document can be read by the movement of the carriage.

This multi-functional peripheral employs a continuous reading function. The continuous reading function treats image data obtained over several times as integrated image data (one image data file). The use of the continuous reading function ensures, for example, reading respective pages of a booklet document like a book and obtaining the read image data as one image data file.

To obtain the image data on the respective pages of the booklet document, the following work is required. Whenever the reading of the read-target page is completed, the booklet on the platen is picked up, the next read-target page is opened, and the booklet is placed on the platen again. In this case, the following complicated work is required. Whenever the booklet is placed again, a start button, which starts image reading, is pressed.

To eliminate such complicated work, the following configuration has been disclosed. After an image forming apparatus with a continuous reading function completes reading the documents, a platen cover is opened to exchange the document on a platen. When a document size detected after the exchange is identical to the document size of the already-obtained document, after an elapse of predetermined time, the image reading automatically starts.

SUMMARY

An image reading apparatus according to one aspect of the disclosure includes an image reading circuit, an instruction accepting circuit, a timer circuit, a standby time determining circuit, and a reading start timing control circuit. The image reading circuit reads an image on a document to create image data. The instruction accepting circuit accepts an image reading instruction. The timer circuit sets a preliminary specified reference event as an origin. The timer circuit measures an elapsed time from the origin until the instruction accepting circuit accepts the image reading instruction. The standby time determining circuit determines a standby time based on the elapsed time measured by the timer circuit. The reading start timing control circuit causes the image reading circuit to start image reading of the document at an elapse of the standby time determined by the standby time determining circuit from the reference event when the reference event occurs after the standby time determining circuit determines the standby time.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure in further detail with reference to the drawings. The following embodies the disclosure as a digital multi-functional peripheral with an image reading unit (an image reading apparatus).

Figure 1:
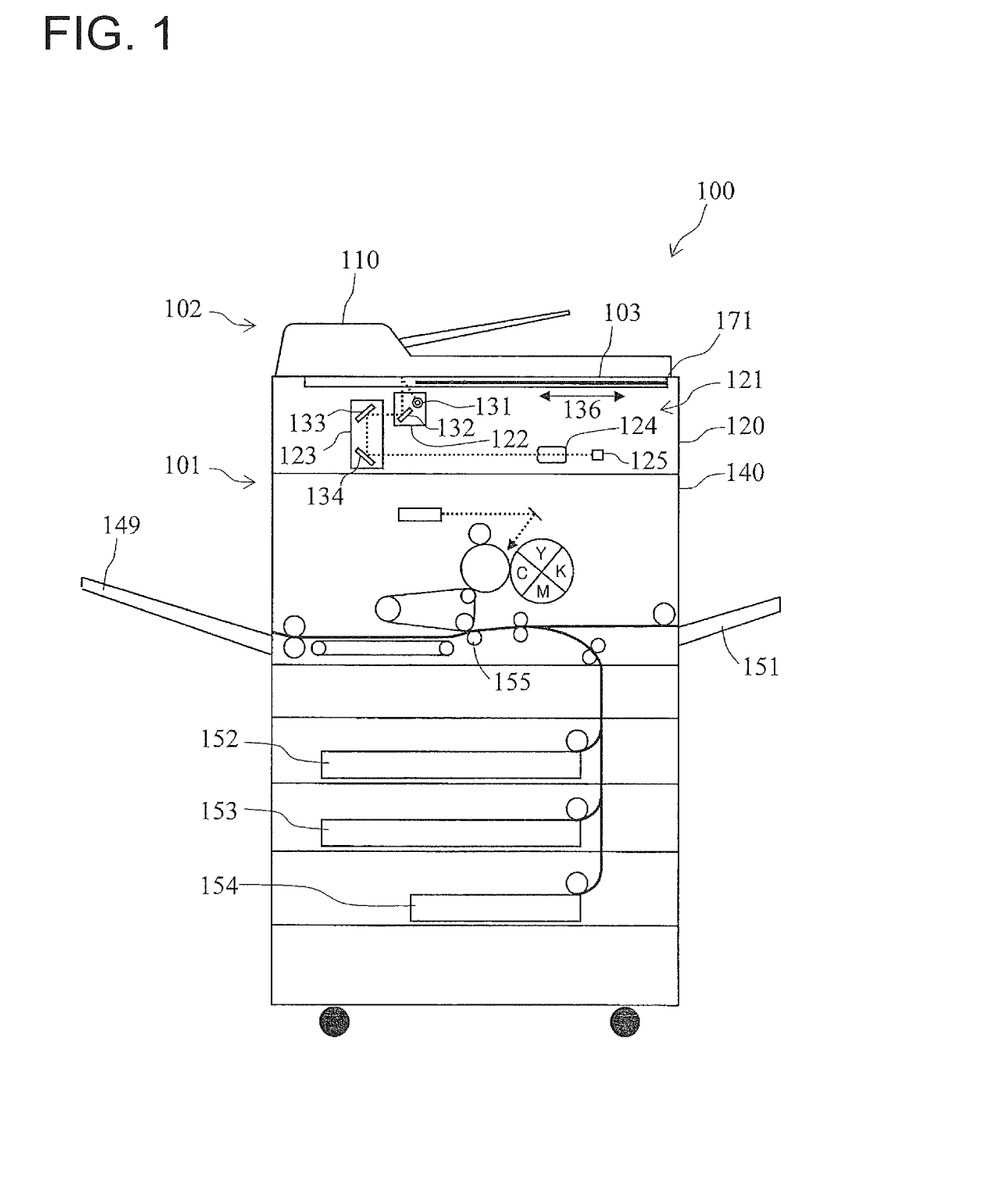
FIG. 1 schematically illustrates an overall configuration of a multi-functional peripheral in one embodiment of the disclosure.

FIG. 1 schematically illustrates an exemplary overall configuration of the digital multi-functional peripheral according to an embodiment. As illustrated in FIG. 1, a multi-functional peripheral 100 includes a main body 101 and a document feeder 110. The main body 101 includes an image reading unit 120 (also referred to as an image reading apparatus or an image reading circuit) and an image forming unit (also referred to as an image forming circuit) 140. The document feeder 110 is mounted over the main body 101. On the top surface of the main body 101, a platen 103, which is formed of a transparent plate such as a contact glass, is located. The platen 103 is opened and closed with a platen cover 102. The platen cover 102 is constituted of the bottom face of the document feeder 110. On the front face of the multi-functional peripheral 100, an operation panel 171 is located. With the operation panel 171, a user can give an instruction to start copying and other instructions to the multi-functional peripheral 100 and check the state and the settings of the multi-functional peripheral 100.

The image reading unit 120 is located under the platen 103. The image reading unit 120 reads images on documents with a scanning optical system 121 to create digital data (image data) of the images. The document can be placed on the platen 103 and the document feeder 110.

The scanning optical system 121 includes a first carriage 122 and a second carriage 123. The first carriage 122 includes a linear-shaped light source 131 and a mirror 132. The second carriage 123 includes mirrors 133 and 134. The light source 131 illuminates the document. The mirrors 132, 133, and 134 guide reflected light from the document to a condensing lens 124. The condensing lens 124 forms the optical image to a light receiving surface of an image sensor 125.

In this scanning optical system 121, the first carriage 122 and the second carriage 123 are located so as to be reciprocated in a sub-scanning direction 136. The movement of the first carriage 122 and the second carriage 123 in the sub-scanning direction 136 ensures the image sensor 125 to read the image on the document placed on the platen 103. To read the image on the document set to the document feeder 110, the image reading unit 120 adjusts the first carriage 122 and the second carriage 123 to an image reading position and temporarily makes the first carriage 122 and the second carriage 123 motionless. The image sensor 125 reads the image on the document passing through the image reading position.

The image forming unit 140 can print the created image data to a paper sheet, which is a transferred body. The created image data can also be transmitted to another apparatus through a network via a network interface (not illustrated) or a similar interface.

The image forming unit 140 prints the image data created by the image reading unit 120 and the image data received from the other apparatus connected to the network on the paper sheet. The image forming unit 140 feeds the paper sheets from a bypass tray 151, sheet feed cassettes 152, 153, and 154, or a similar device to a transfer unit 155, which transfers toner images. The paper sheet on which the toner images have been transferred by the transfer unit 155 is discharged to a sheet discharge tray 149.

Figure 2:
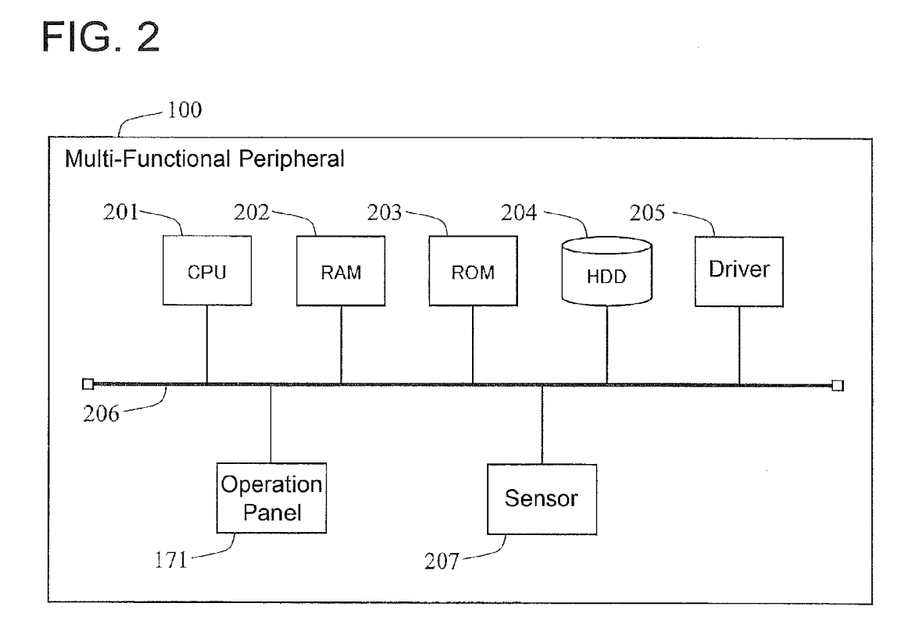
FIG. 2 illustrates the hardware configuration of the multi-functional peripheral in one embodiment.

FIG. 2 illustrates a hardware configuration of a control system in the multi-functional peripheral. In the multi-functional peripheral 100 of the embodiment, a Central Processing Unit (CPU) 201, a Random Access Memory (RAM) 202, a Read Only Memory (ROM) 203, a Hard Disk Drive (HDD) 204, and a driver are connected via an internal bus 206. The driver 205 handles respective driving units of the document feeder 110, the image reading unit 120, and the image forming unit 140. The ROM 203, the HDD 204, or a similar memory stores programs. The CPU 201 controls the multi-functional peripheral 100 following commands of the control programs. For example, the CPU 201 uses the RAM 202 as a work area to control operations of the respective driving units by receiving/transmitting data and instructions with the driver 205. The HDD 204 is also used to accumulate the image data obtained by the image reading unit 120 and the image data received from the other apparatus through the network.

To the internal bus 206, the operation panel 171 and various sensors 207 are also connected. The operation panel 171 accepts the user's operation and supplies a signal based on the operation to the CPU 201. The operation panel 171 displays an operation screen on an equipped display following a control signal from the CPU 201. The sensor 207 includes various sensors such as a detecting sensor for opening/closing the platen cover 102, a detecting sensor of a document on the platen 103, a temperature sensor for a fixing unit, and a detecting sensor for a conveyed paper sheet or document.

The CPU 201, for example, runs the programs stored in the ROM 203 to achieve the following respective units (function blocks) and a control of the operations of the respective units in response to the signals from these sensors.

Figure 3:
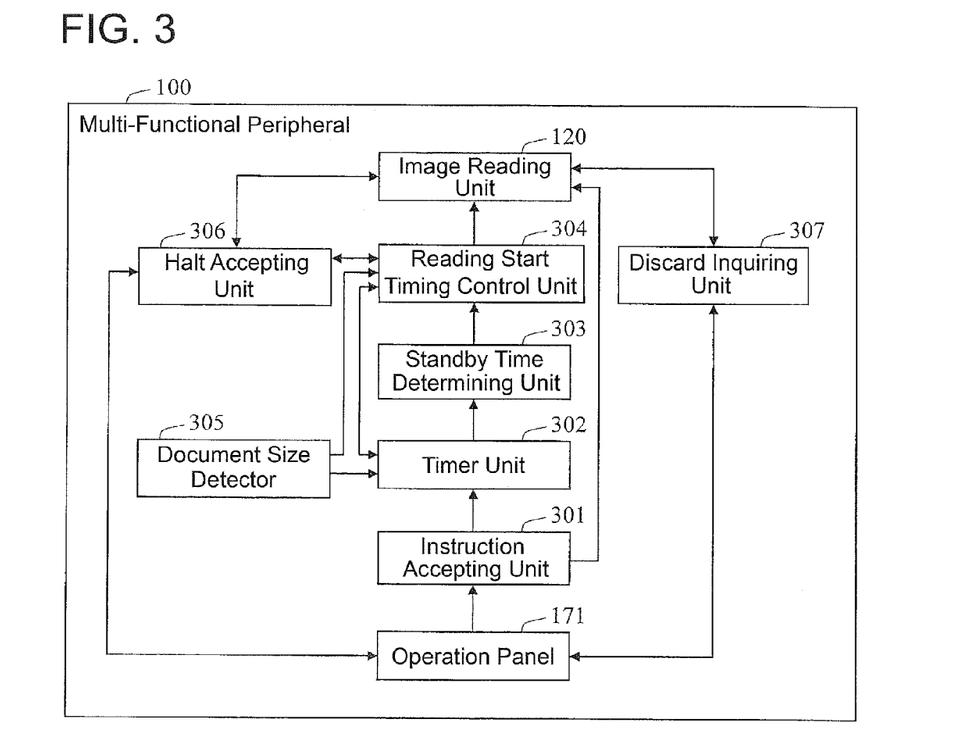
FIG. 3 illustrates a multi-functional peripheral in one embodiment.

FIG. 3 illustrates parts related to the image reading by the multi-functional peripheral of the embodiment. As illustrates in FIG. 3, the multi-functional peripheral 100 includes an instruction accepting unit (also referred to as an instruction accepting circuit) 301, a timer unit (also referred to as a timer circuit) 302, a standby time determining unit (also referred to as a standby time determining circuit) 303, and a reading start timing control unit (also referred to as a reading start timing control circuit) 304.

The instruction accepting unit 301 accepts an image reading instruction by a user. The user inputs the image reading instruction by, for example, pressing a start key, which is located at the operation panel 171.

The timer unit 302 measures elapsed time until the instruction accepting unit 301 accepts the image reading instruction setting a preliminary specified reference event as an origin. Although not specifically limited, this embodiment configures the timer unit 302 as a counter that increases a counted value one by one at constant time intervals.

The reference event means operations and processes detectable by the multi-functional peripheral 100 among the operations and processes always performed by the user or the multi-functional peripheral 100 in a process until the image reading instruction is input in the image reading. For example, in the image reading of the document placed on the platen 103, setting the platen cover 102 in the open state, setting the platen cover 102 in the closed state, detecting the document size, or a similar event becomes the reference event. In the image reading of the document placed on the document feeder 110, placement of a bundle of documents on the document feeder 110, disappearance of the bundle of documents on the document feeder 110, or a similar event possibly becomes the reference event.

For example, in the image reading of the document placed on the platen 103, when the reference event is a document size detection completion, the timer unit 302 measures the elapsed time from the document size detection completion until pressing the start key, which is located at the operation panel 171. In this case, the document size detection can be achieved by any known configuration. Although not specifically limited, this embodiment has a configuration where a plurality of photosensors optically detect the document size. The photosensors are located under the platen 103 corresponding to the document sizes. In this embodiment, a document size detector (also referred to as a document size detecting circuit) 305 detects the document size based on an output value from each photosensor. At this time, to detect the document size in a main-scanning direction, the scanning optical system 121 may be used.

The standby time determining unit 303 determines standby time based on the elapsed time, which is measured by the timer unit 302. In this embodiment, the standby time determining unit 303 assigns preliminary specified margin time to the elapsed time, which is measured by the timer unit 302, to determine the standby time. The margin time can be assigned, for example, by adding the preliminary specified fixed time to the elapsed time or multiplying the elapsed time by the preliminary specified constant equal to or more than 1.

If the reference event occurs after determination of the standby time by the standby time determining unit 303, when the standby time, which is determined by the standby time determining unit 303, is passed after this reference event, the reading start timing control unit 304 causes the image reading unit 120 to start reading the images on the document. For example, in the image reading of document placed on the platen 103, when the reference event is the document size detection completion, the standby time determining unit 303 determines the standby time based on the elapsed time from the document size detection completion until pressing the start key in the image reading of the first document by the user. In this case, when the document size detection completion occurs in the image reading of the second or later document, the reading start timing control unit 304 causes the image reading unit 120 to start reading the images on the document after the elapse of the standby time, which is determined by the standby time determining unit 303, from the document size detection completion. This embodiment employs the following configuration. When the document size detector 305 detects the document size identical to the already-detected document size, the reading start timing control unit 304 causes the image reading unit 120 to start reading the images on the document. When the document size detector 305 detects a document size different from the already-detected document size, the reading start timing control unit 304 does not cause the image reading unit 120 to start reading the images on the document. That is, the reading start timing control unit 304 has a configuration that does not apply automatic reading to the document whose size is detected for the first time.

The multi-functional peripheral 100 further includes a halt accepting unit (also referred to as a halt accepting circuit) 306 and a discard inquiring unit (also referred to as a discard inquiring circuit) 307.

The halt accepting unit 306 accepts an image reading halt instruction by the user. Although not specifically limited, in this embodiment, the user inputs the image reading halt instruction through the operation panel 171.

On completion of the image reading of the document based on the instruction by the reading start timing control unit 304, the discard inquiring unit 307 inquires whether to discard the image data obtained by this image reading or not to the user. The discard inquiring unit 307, for example, displays a selection button, which is to select the discard of the image data, on the display provided with the operation panel 171 to inquire of the user. When the user selects this selection button, the obtained image data is discarded. When the user does not select this selection button, the obtained image data is not discarded but is held.

Figure 4A:
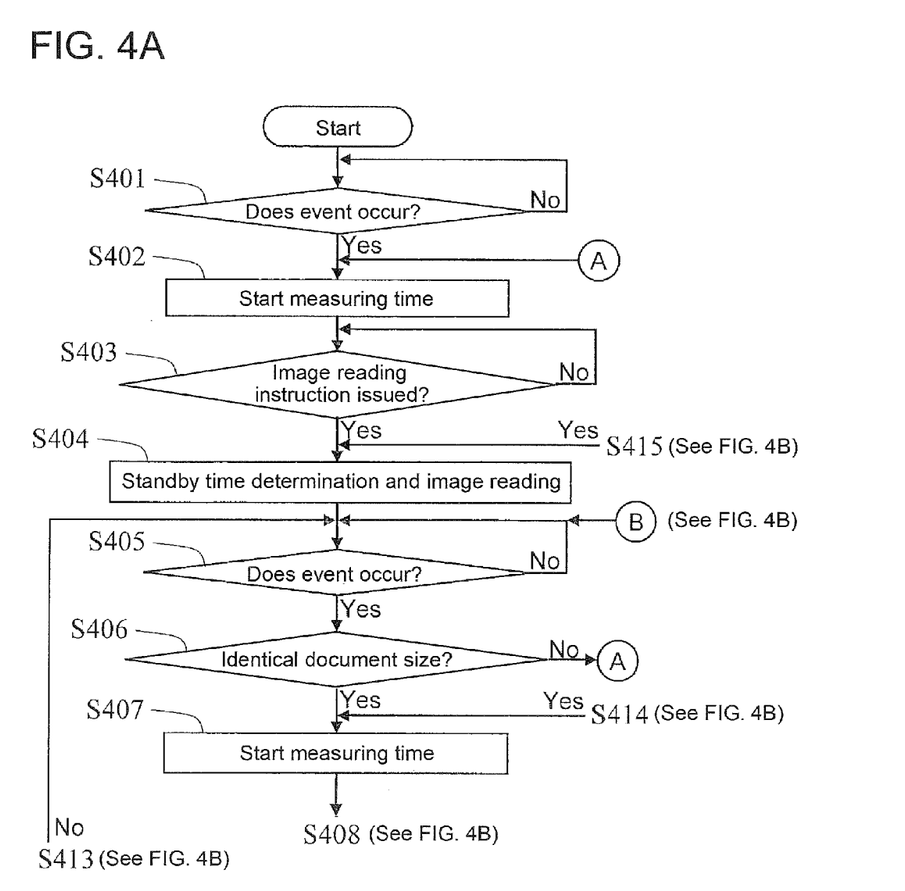
FIGS. 4A and 4B illustrate an exemplary continuous image reading procedure performed by the multi-functional peripheral in one embodiment.
Figure 4B:
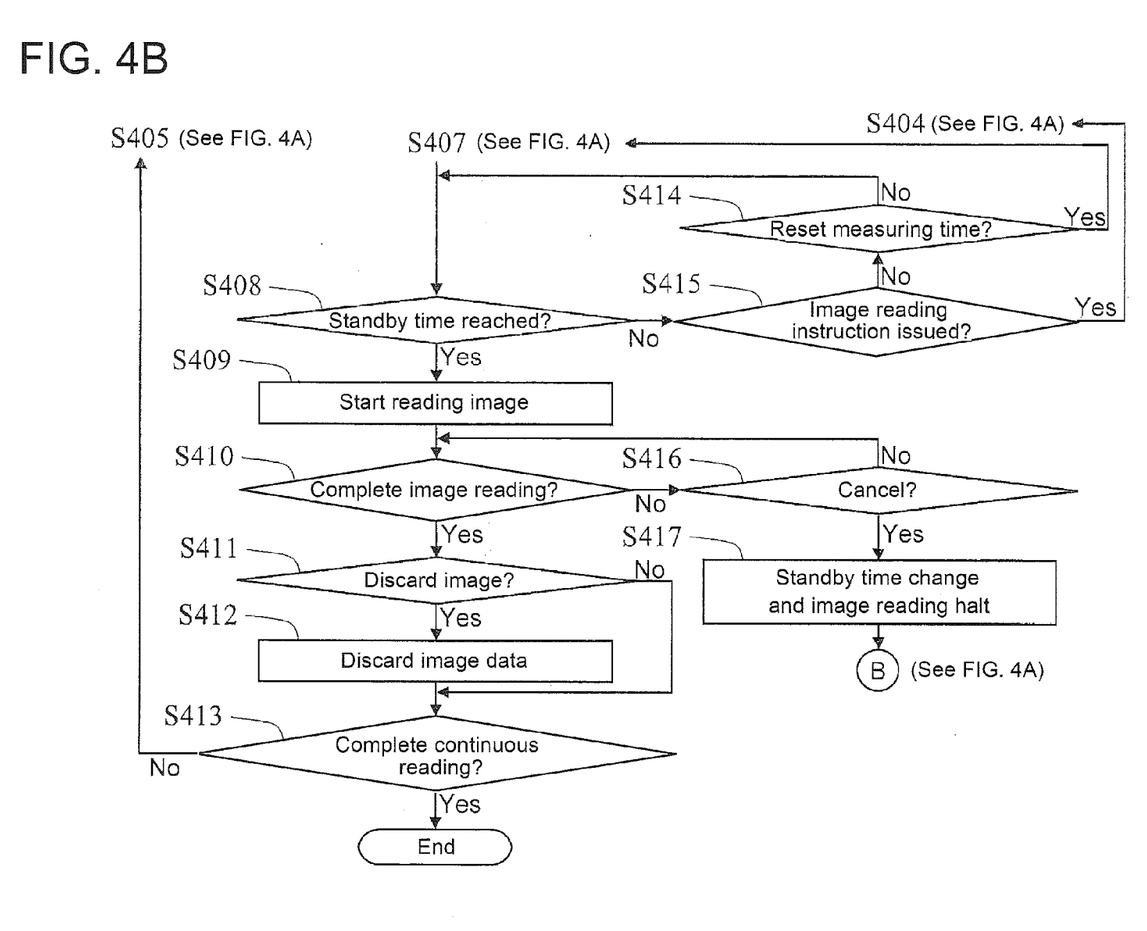

FIGS. 4A and 4B illustrate an exemplary continuous image reading procedure performed by the multi-functional peripheral 100. This procedure, for example, starts triggering the selection of the continuous reading function by the user through the operation panel 171. The continuous reading function treats the image data obtained over several times as integrated image data (one image data file). The following describes a case based on a case where the reference event is the document size detection completion in the image reading of the document placed on the platen 103.

The user who has selected the continuous reading function first opens the platen cover 102 and places the first document on the platen 103. Then, the user closes the platen cover 102. At this time, the document size detector 305 detects the size of the document placed on the platen 103. As described above, in this example, the reference event is the document size detection completion. Accordingly, until the completion of the document size detection, the procedure does not progress (No at Step S401). Then, when the document size detection, which is performed after the platen cover 102 is closed (or immediately before the platen cover 102 is completely closed), is completed, the procedure progresses (Yes at Step S401).

In this embodiment, the document size detector 305 that has completed the document size detection notifies the timer unit 302 of the fact. The timer unit 302, which receives this notification, starts measuring the elapsed time from the document size detection completion (Step S402). This measurement of the elapsed time is continued until the user inputs the image reading instruction (No at Step S403).

The user who has closed the platen cover 102 performs a desired setting operation, such as enlargement, reduction, and change of the resolution, as necessary through the operation panel 171. On the completion of the setting operation, the user presses the start key, which is provided with the operation panel 171, to input the image reading instruction. The instruction accepting unit 301 accepts this image reading instruction (Yes at Step S403). The instruction accepting unit 301 that has accepted the image reading instruction notifies the timer unit 302 and the image reading unit 120 of the fact.

Thorough the above-described processes of operations by the user, the timer unit 302 measures the elapsed time from the document size detection completion until the image reading instruction acceptance. That is, the timer unit 302 measures the elapsed time from the notification by the document size detector 305 until the notification by the instruction accepting unit 301. The timer unit 302 inputs the measured elapsed time to the standby time determining unit 303. At this time, the standby time determining unit 303 determines the standby time based on the input elapsed time (Step S404). Here, the standby time determining unit 303 adds the preliminary specified margin time to the input elapsed time, thus determining the standby time. The standby time determining unit 303, which has determined the standby time, inputs the determined standby time to the reading start timing control unit 304.

Meanwhile, upon the notification from the instruction accepting unit 301, the image reading unit 120 starts reading the images on the document. On completion of the image reading, the user opens the platen cover 102. The user removes the first document on the platen 103 and places the second document on the platen 103. The user closes the platen cover 102. At this time, the document size detector 305 detects the document size placed on the platen 103.

As described above, in this example, the reference event is the document size detection completion. Accordingly, until completion of the document size detection, the procedure does not progress (No at Step S405). On completion of the document size detection of the second document, the document size detector 305 confirms whether the detected document size is identical to the previously detected document size or not (Step S406). Although not specifically limited, for this confirmation, this embodiment employs the following configuration. Until the continuous image reading is terminated, the document size detector 305 holds the document size detected by itself during the continuous image reading.

When the second document size is identical to the already-detected document size (for example, the first document size is A4 and the second document size is also A4), the document size detector 305 notifies the timer unit 302 and the reading start timing control unit 304 of the fact. The timer unit 302, which has received this notification, starts measuring the elapsed time from the document size detection completion (Yes at Step S406, S407). The reading start timing control unit 304 compares the elapsed time measured by the timer unit 302 and the standby time held by itself to monitor whether the elapsed time has reached the standby time or not (Step S408).

When the measured time by the timer unit 302 reaches the standby time, the reading start timing control unit 304 instructs the image reading unit 120 to read the image on the document. Upon this instruction, the image reading unit 120 starts reading the document image (Yes at Step S408, S409). Thus, until the reading start timing control unit 304 outputs the image reading instruction, the user can perform the desired setting operation, such as enlargement, reduction, and change of the resolution, on the second document as necessary through the operation panel 171. As described above, this embodiment determines the standby time longer than the time taken for the setting operation for the first document by the amount of margin time. Accordingly, the user can perform the setting operation at least equivalent to the setting operation performed on the first document until the image reading automatically starts.

On completion of the image reading, the image reading unit 120 inquires of the user whether to hold the obtained image as data of the continuous image reading or not (Yes at Step S410, S411). This inquiry is executed through the discard inquiring unit 307. That is, the image reading unit 120 that has completed the image reading notifies the discard inquiring unit 307 of the fact. Upon this notification, as described above, the discard inquiring unit 307 displays the selection button, which is to select the discard, on the display of the operation panel 171 to inquire of the user. When the user selects the selection button, the image obtained at this time is discarded (Yes at Step S411, S412). When the user does not select the selection button and performs another operation, such as opening the platen cover 102, the image obtained at this time is held as the data of the continuous image reading (No at Step S411). The use of such configuration allows the user to extremely easily retry the image reading process even if the acquisition of image data has failed.

Meanwhile, when the second document size differs from the already-detected document size (for example, the first document size is A4, and the second document size is B5), the document size detector 305 notifies the timer unit 302 and the reading start timing control unit 304 of the fact. The timer unit 302, which has received this notification, starts measuring the elapsed time from the document size detection completion (No at Step S406, S402). This measurement of the elapsed time is continued until the user inputs the image reading instruction (No at Step S403).

The user who has closed the platen cover 102 performs a desired setting operation, such as enlargement, reduction, and change of the resolution, on the second document as necessary through the operation panel 171. On the completion of the setting operation, the user presses the start key, which is provided with the operation panel 171, to input the image reading instruction. The instruction accepting unit 301 accepts this image reading instruction (Yes at Step S403). The instruction accepting unit 301 that has accepted the image reading instruction notifies the timer unit 302 and the image reading unit 120 of the fact.

At this time, the timer unit 302 measures the elapsed time from the document size detection completion until the image reading instruction acceptance of the second document. The timer unit 302 inputs the measured elapsed time to the standby time determining unit 303. At this time, the standby time determining unit 303 determines the standby time based on the input elapsed time. The standby time determining unit 303, which has determined the standby time, inputs the determined standby time to the reading start timing control unit 304 (Step S404).

Although not specifically limited, this embodiment employs the following configuration. When new standby time is input due to different document size, the reading start timing control unit 304 holds the shorter standby time as the standby time applied after that. As described above, based on the notification from the document size detector 305, the reading start timing control unit 304 can easily identify whether the standby time has been newly input due to the difference in document size or not. Instead of this configuration, the following configurations can also be employed. The reading start timing control unit 304 holds the longer standby time as the standby time applied after that. Alternatively, the reading start timing control unit 304 holds the standby time for each document size.

The use of the above-described configurations avoids applying the automatic reading to the first-appeared document whose size is different. Accordingly, for example, the user can perform a new setting operation such as enlargement and reduction, which is applied to a different document size, on the document of different size without considering the start of automatic image reading.

The above-described procedure is applied to the second and subsequent documents until the user inputs a termination instruction for the continuous reading function (No at Step S413). Although not specifically limited, the multi-functional peripheral 100 always displays a read function end button, which terminates the continuous reading function, on the display of the operation panel 171. For example, the read function end button is displayed on any one of the four corners of the display. The read function end button does not overlap with other displays, such as the above-described inquiry about discard of the image data. The selection of the read function end button by the user terminates the procedure (Yes at Step S413).

The multi-functional peripheral 100 of this embodiment includes a reset function for the standby time. The reset function for the standby time is used when the setting of the standby time determined as described above is inappropriate; therefore, the standby time is desired to be changed to shorter time or longer time.

For example, under a condition where the document size is identical to the already-detected document size and the reading start timing control unit 304 monitors whether the elapsed time has reached the standby time or not, when the user wants to further shorten the standby time due to the long standby time, it is only necessary for the user to press the start key on the operation panel 171 (No at Step S408 and Yes at S415).

At this time, the timer unit 302 obtains the elapsed time from the document size detection completion until the image reading instruction acceptance on the read-target document. The timer unit 302 starts measuring time from the time point of the document size detection completion on the read-target document. Accordingly, the measured time value until the instruction accepting unit 301 accepts a document reading instruction matches the elapsed time. The timer unit 302 inputs the measured elapsed time to the standby time determining unit 303. At this time, the standby time determining unit 303 determines the standby time based on the input elapsed time (Step S404).

The standby time determining unit 303 that has determined the standby time inputs the determined standby time to the reading start timing control unit 304. This sets the new standby time shorter than the previous standby time. In this case, the reading start timing control unit 304 does not receive a notification from the document size detector 305. Accordingly, the reading start timing control unit 304 can recognize that this setting is not a setting for the new standby time caused by different document size but is an update of the standby time inappropriately set. In this case as well, since the instruction accepting unit 301 notifies the image reading unit 120 of the issue of the image reading instruction, the image reading unit 120 starts reading the image on the read-target document.

Next, the following describes a case where the user wants longer standby time due to the short standby time, such as the case where the image reading automatically starts during the setting operation, under the condition where the image reading corresponding to the instruction by the reading start timing control unit 304 is in execution. In this case, it is only necessary for the user to select a reading halt button, which is displayed on the display of the operation panel 171 during image reading (No at Step S410 and Yes at S416).

As described above, the inquiry whether to halt the image reading by the halt accepting unit 306 or not is executed through the operation panel 171. That is, the reading start timing control unit 304 that has input the image reading instruction to the image reading unit 120 notifies the halt accepting unit 306 of the fact. Upon this notification, the halt accepting unit 306 displays the reading halt button on the display of the operation panel 171. The halt accepting unit 306 displays the reading halt button on the display until the read completion is notified from the image reading unit 120.

When the user selects the reading halt button, the halt accepting unit 306 notifies the reading start timing control unit 304 and the image reading unit 120 of the fact. Upon this notification, the reading start timing control unit 304 determines the standby time longer than the standby time at the time point as the new standby time. Although not specifically limited, in this embodiment, the reading start timing control unit 304 multiplies the held standby time by the preliminary specified constant (for example, 1.5) to determine the new standby time (Step S417). This sets the new standby time longer than the previous standby time. Upon the notification from the halt accepting unit 306, the image reading unit 120 halts the image reading and discards the image data during acquisition. When the image reading is completed without the selection of the reading halt button by the user, the halt accepting unit 306 terminates the inquiry for the image reading halt (No at Step S416 and Yes at S410).

Under the condition where the reading start timing control unit 304 monitors whether the elapsed time has reached the standby time or not, if the user performs an operation where measurement of the time should be reset on the multi-functional peripheral 100, the timer unit 302 newly start measuring the elapsed time from the time point at which the operation has been detected (No at Step S415, Yes at S414, and S407). The operation where measurement of the time should be reset is, for example, as follows. The platen cover 102 is opened and then is closed where it is assumed that the document is exchanged, the placement position is adjusted, or a similar operation is performed. Alternatively, the front cover, which is the cover of the image forming unit 140, is opened and then is closed where any sort of malfunction is assumed. The timer unit 302 can detect such operation based on output signals from various sensors located at the multi-functional peripheral 100. When the operation of opening and then closing the platen cover 102 is detected during the image reading, there is a possibility that the image on the document was not able to be normally obtained. The discard inquiring unit 307 may be configured in this case such that the discard inquiring unit 307 inquires the user whether to discard the image data obtained by this image reading or not.

The document size detection completion is set as the reference event above. However, as the reference event, the closed state of the platen cover 102 from the open state, the open state of the platen cover 102 from the closed state, or a similar state can also be employed. When setting the former event as the reference event, since the event is a start trigger for the above-described document size detection, the effect similar to the above-described configuration can be actually obtained. When setting the latter event as the reference event, the user can perform work, for example, to change the page of the book, the booklet, or a similar document and place the book, the booklet, or a similar document again on the platen 103 within the standby time.

The case where the document is placed on the platen 103 is described above. The above-described continuous reading function is also applicable to the case where the bundle of documents is placed on the document feeder 110 by several times for image reading. As the reference event, the placement of the bundle of documents on the document feeder 110, the disappearance of the bundle of documents on the document feeder 110, or a similar status can be employed. In this case, the above-described operations where the measurement of the time should be reset include, for example, the following. A setting sensor, which detects presence of the bundle of documents on the document feeder 110, changes from the off-state (no documents) to the on-state (with documents). The position of the cursor, which guides the bundle of documents placed on the document feeder 110 in the conveyance direction, changes. After the cover of the document feeder 110 is in the open state, the cover is closed.

Furthermore, a configuration by which the user can appropriately select the above-described reference events can also be employed.

As described above, based on the elapsed time from the reference event until the instruction accepting unit 301 accepts the image reading instruction, when the reference event occurs after that, this multi-functional peripheral 100 determines the standby time until the image reading of the document automatically starts after this reference event. This configuration determines the standby time based on the usage status of the user. For example, the standby time for the user who performs work that requires time from the reference event until the image reading instruction acceptance is determined to be time sufficient for the work. The standby time for the user who does not perform work that requires time from the reference event until the image reading instruction acceptance is determined to be short time. This ensures determining the standby time further appropriate for any sort of user, ensuring restraining unnecessary waiting time.

Even if the standby time determined first by the standby time determining unit 303 is inappropriate, the multi-functional peripheral 100 can change the standby time to more appropriate time according to the subsequent user's desire.

The above-described embodiments do not limit the technical scope of the disclosure. Various modifications and applications are possible within the scope of the disclosure in addition to the already-described embodiments. For example, as an especially preferable aspect, the embodiment exemplifies the configuration that includes the document size detector 305, the halt accepting unit 306, and the discard inquiring unit 307. However, these devices are merely selected components and are not components essential to the disclosure. Even the configuration does not include these components, the disclosure can determine the further appropriate standby time for any sort of user. Similarly, the configuration that does not apply the automatic image reading to documents of different size is also a selected configuration.

The order of the respective steps in the flowchart shown in FIGS. 4A and 4B can be appropriately changed within the scope achieving the equivalent effect. For example, the example in FIGS. 4A and 4B determines the standby time based on the image reading of the first document. However, the time required for the setting operation to the first document is possibly extraordinarily longer than the time required for the setting operation to the second and the subsequent documents. Accordingly, the disclosure can also be configured that only the document size detection is performed on the first document and the standby time is determined based on the image reading of the second document.

Additionally, the above-described embodiment embodies the disclosure as the digital multi-functional peripheral; however, the disclosure is not limited to this apparatus. The disclosure is also applicable to any image reading apparatus and image forming apparatus with an image reading function, such as a scanner, a facsimile, and a copier.

According to the disclosure, any sort of user can achieve further appropriate continuous reading. Accordingly, the disclosure is effective as the image reading apparatus and the image forming apparatus.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image reading apparatus comprising:
    an image reading circuit that reads an image on a document to create image data;
    an instruction accepting circuit that accepts an image reading instruction;
    a timer circuit that sets a preliminary specified reference event as an origin, the timer circuit measuring an elapsed time from the origin until the instruction accepting circuit accepts the image reading instruction;
    a standby time determining circuit that determines a standby time based on the elapsed time measured by the timer circuit,
    a reading start timing control circuit that causes the image reading circuit to start image reading of the document at an elapse of the standby time determined by the standby time determining circuit from the preliminary specified reference event when the preliminary specified reference event occurs after the standby time determining circuit determines the standby time; and
    a document size detection circuit that detects a size of a document,
        wherein the preliminary specified reference event is an operation or a process detectable by the image reading apparatus among the operations and processes performed by a user or the image reading apparatus in an image reading process until the image reading instruction is input in the image reading process, and
        wherein when the document size detection circuit detects a document size identical to an already-detected document size, the reading start timing control circuit causes the image reading circuit to start the image reading of the document.

2. The image reading apparatus according to claim 1, further comprising
    a discard inquiring circuit that inquires whether to discard image data obtained by the image reading or not upon completion of the image reading of the document based on an instruction from the reading start timing control circuit.

3. The image reading apparatus according to claim 1, wherein the preliminary specified reference event is:
    document size detection completion by a document size detection circuit that detects a size of a document;
    a state change from a closed state to an open state of a platen cover that opens or closes a platen for placing the document;
    a state change from the open state to the closed state of the platen cover; or
    a placement of a bundle of documents to a document feeder, the document feeder supplying the documents to the image reading circuit.

4. An image forming apparatus comprising:
    the image reading apparatus according to claim 1; and
    an image forming circuit that prints a document image read by the image reading apparatus on a transferred body.

5. An image reading apparatus comprising:
    an image reading circuit that reads an image on a document to create image data;
    an instruction accepting circuit that accepts an image reading instruction;
    a timer circuit that sets a preliminary specified reference event as an origin, the timer circuit measuring an elapsed time from the origin until the instruction accepting circuit accepts the image reading instruction;
    a standby time determining circuit that determines a standby time based on the elapsed time measured by the timer circuit; and
    a reading start timing control circuit that causes the image reading circuit to start image reading of the document at an elapse of the standby time determined by the standby time determining circuit from the preliminary specified reference event when the preliminary specified reference event occurs after the standby time determining circuit determines the standby time,
    wherein the preliminary specified reference event is an operation or a process detectable by the image reading apparatus among the operations and processes performed by a user or the image reading apparatus in an image reading process until the image reading instruction is input in the image reading process, and
    wherein when the instruction accepting circuit accepts the image reading instruction under a situation where the reading start timing control circuit waits for an elapse of the standby time, the standby time determining circuit determines a new standby time based on an elapsed time measured by the timer circuit at the time.

6. The image reading apparatus according to claim 5, further comprising
    a discard inquiring circuit that inquires whether to discard image data obtained by the image reading or not upon completion of the image reading of the document based on an instruction from the reading start timing control circuit.

7. The image reading apparatus according to claim 5, wherein the preliminary specified reference event is:
    document size detection completion by a document size detection circuit that detects a size of a document;

a state change from a closed state to an open state of a platen cover that opens or closes a platen for placing the document;

a state change from the open state to the closed state of the platen cover; or a placement of a bundle of documents to a document feeder, the document feeder supplying the documents to the image reading circuit.

8. An image forming apparatus comprising:

the image reading apparatus according to claim 5; and an image forming circuit that prints a document image read by the image reading apparatus on a transferred body.

9. An image reading apparatus comprising:

an image reading circuit that reads an image on a document to create image data;

an instruction accepting circuit that accepts an image reading instruction;

a timer circuit that sets a preliminary specified reference event as an origin, the timer circuit measuring an elapsed time from the origin until the instruction accepting circuit accepts the image reading instruction;

a standby time determining circuit that determines a standby time based on the elapsed time measured by the timer circuit, a reading start timing control circuit that causes the image reading circuit to start image reading of the document at an elapse of the standby time determined by the standby time determining circuit from the preliminary specified reference event when the preliminary specified reference event occurs after the standby time determining circuit determines the standby time; and a halt accepting circuit that accepts a halt instruction of the image reading, wherein the preliminary specified reference event is an operation or a process detectable by the image reading apparatus among the operations and processes performed by a user or the image reading apparatus in an image reading process until the image reading instruction is input in the image reading process, and wherein when the halt accepting circuit accepts the halt instruction during the image reading of a document based on an instruction by the reading start timing control circuit, the standby time determining circuit sets a standby time longer than a standby time at a time point of accepting the halt instruction as a new standby time.

10. The image reading apparatus according to claim 9, further comprising a discard inquiring circuit that inquires whether to discard image data obtained by the image reading or not upon completion of the image reading of the document based on an instruction from the reading start timing control circuit.

11. The image reading apparatus according to claim 9, wherein the preliminary specified reference event is:

document size detection completion by a document size detection circuit that detects a size of a document;

a state change from a closed state to an open state of a platen cover that opens or closes a platen for placing the document;

a state change from the open state to the closed state of the platen cover; or a placement of a bundle of documents to a document feeder, the document feeder supplying the documents to the image reading circuit.

12. An image forming apparatus comprising:

the image reading apparatus according to claim 9; and an image forming circuit that prints a document image read by the image reading apparatus on a transferred body.

* * * * *